United States Patent Office 3,560,431
Patented Feb. 2, 1971

3,560,431
PREVENTION OF YELLOWING IN POLYAMIDES
Gene C. Weedon, 5431 Lingle Lane, Richmond, Va. 23234, and Joseph D. DeCaprio, 1004 Terrace Ave., Hopewell, Va. 23860
No Drawing. Filed July 9, 1968, Ser. No. 743,290
Int. Cl. C08g 51/56, 51/62
U.S. Cl. 260—45.7     6 Claims

ABSTRACT OF THE DISCLOSURE

The base color and yellowing tendency of polyamide material containing alkali metal iodides is substantially improved by combining therewith a trace amount of an alkali metal salt additive, such as sodium sulfite, sodium thiosulfate or a bisulfite addition compound of acetone or an appropriate aldehyde, the additive being introduced into the polyamide material or the surface of the material being contacted with a solute containing the alkali salt additive.

BACKGROUND OF THE INVENTION

This invention relates to a process for improving the base color and yellowing characteristics of a polyamide material containing an alkali metal iodide by combining therewith a small but effective amount of an additive such as sodium sulfite, sodium thiosulfate or a bisulfite addition compound of acetone or an appropriate aldehyde. Surprisingly enough, these additives, even when combined in only trace amounts, very effectively counteract the yellowing tendencies of the polyamide-alkali metal iodide material. The anti-yellowing additives or agents may be combined in a number of different ways, including exposing the surface of the polyamide-alkali metal material to a solute containing the agent.

The term polyamide material used herein has a well established meaning. It is a categorical term for any long-chain synthetic polymeric amide which has recurring carbonamide groups as an integral part of the main polymer chain and which is capable of being formed into a filament in which the structural elements are oriented in the direction of its axis. The most common polyamide materials, also known as nylons, are obtained by condensation of diamines with dicarboxylic acids or by the auto-condensation of amine-substituted carboxylic acids such as initial materials generally having at least six atoms in a chain. For example, the most common specific nylon resin is that obtained by the polycondensation of hexamethylenediamine adipate.

It is well known that polyamide materials now in commerical use yellow on aging. Potassium iodide, commonly used in the production of polyamide materials to prevent degeneration of the resin upon exposure to heat, apparently causes undesirable yellowing in the material upon exposure to conditions which would normally promote the oxidation of iodide salts, which conditions are exposure to air, light, and acidic media. Quite surprisingly, however, it has been found that discoloration occurs prior to exposure, e.g. in the spinning process, depending upon the severity of same. Furthermore, while the yellowing process in heat stabilized nylon materials would seem to suggest an oxidative mechanism yielding free iodine, tests for iodine in the exposed yarn or yarn extracts are usually negative. Consequently, the causes and cures for yellowing are perplexing.

The yellowing tendency of these heat stabilized polyamide materials poses a substantial problem in the commercial use of products so composed, since this yellowing causes dyeing problems due to the variations in the shade of yarns which have different exposure histories. Obviously, elimination of this discoloration increases the shelf life of these heat stabilized materials, thereby enhancing their commercial appeal.

It has been now found, quite surprisingly, that a very small amount of the alkali salt additive added to the polyamide material, applied in combination with a finish or applied as an over-finish, substantially improves the base color and yellowing tendency of such material. The fact that these low concentrations of materials are sufficient to substantially reduce yellowing is unexpected. In keeping with the perplexities alluded to above, we note that the system of this invention, as composed, exhibits in some respects a catalytic effect in that a small amount of a compound produces an effect disproportionate to its concentration.

In this invention the ratio of stabilizer to iodide is is within the range of about .02/1 to .2/1, which translates to between 2 and 20% based on the weight of alkali metal iodide introduced into the material during processing.

Other objects and advantages of the instant process for treating polyamide materials will become more apparent upon examination of the following more detailed disclosure.

SUMMARY OF THE INVENTION

The aforementioned yellowing in the presence of light and air occurs rapidly when potassium iodide concentrations exceed 0.1% by weight, based upon the total polyamide weight concentration. The stabilizers contemplated herein include the alkali metal salts of sulfites, nitrites, thiosulfate, borohydrides and the bisulfite salts of acetone, methyl ethyl ketone, other methyl ketones and aromatic and lower alkanols such as benzaldehyde, acetaldehyde and butyraldehyde.

The alkali salts and bisulfite salts can be combined with the polyamide solids either as a finish thereon or impregnated therein, the amount of alkali salt stabilizer necessary to prevent yellowing being about .02/1 to about .2/1 grams per gram of potassium iodide. The bisulfite salt organic addition complexes, however, are preferably applied either in a finish component or as an aqueous solution over-finish, the bisulfite salt complex concentration necessary to prevent yellowing being from about 0.1% to about 5.0% by weight based upon the total weight of finish formulation.

It has been found that, depending upon the severity of the spinning operation in the preparation of nylon materials, for example, but not limited to nylon 6, different degrees of yellowing will occur before the application of a finish. The additives contemplated herein, quite surprisingly, essentially remove the color from the nylon material to allow a more uniform color in the unexposed material; furthermore, they substantially eliminate discoloration due to iodide interaction.

To demonstrate the practicality of using alkali salt additives, exposed, heat stabilized nylon yarns are immersed for various periods of time in a variety of available alkali salt additives. The results of these demonstrations will be more fully discussed in conjunction with the description of the preferred embodiments of the present invention. A one percent solution by weight of most of the alkali salt additives, it has been found, is sufficient to remove the color from exposed yarns immediately upon contact, longer immersion times resulting in significant improvement in the whiteness of the original unexposed yarn. The degree of whitening depends upon the shade of the unexposed yarn; in other words, the more distinct the discoloration, the more noticeable the effect of the additives of the present invention.

Pursuant to the instant discovery, additives of the type herein are preferably non-acidic in nature. For example, oxalic, ascorbic, hypophosphorus acids, and triethanol ammonium sulfite were all relatively ineffective as whitening agents.

DESCRIPTION OF THE PREFERRED EMBODIMENTS

Exposed yarns were immersed for various times in a variety of available agents to determine the effectiveness of additives in allaying the discoloration of heat stabilized nylon 6 samples, as set forth in Table I below. Exposed yarn, as used above, refers to simulated exposure to light and air, which elements tend to activate discoloration, whereby a yarn sample was placed sixteen inches from a daylight fluorescent light for a continuous period of one week.

TABLE I
[Effect of various reducing agents on yarn* color]

| Agent | Weight percent in $H_2O$ | Base color | Yarn color after 1 min. | Yarn color after immersion (dry) |
|---|---|---|---|---|
| $Na_2SO_3$ | 1.0 | Deep yellow (exposed) | White | White (1 hour). |
| Acetone/$HSO_3Na$ | 1.0 | do | do | Do. |
| Butyraldehyde/$HSO_3Na$ | 1.0 | Yellow (exposed) | do | Do. |
| $Na_2SO_3$ | 1.0 | do | do | Do. |
| $Na_2SO_3$ | 1.0 | do | do | White (3 days). |
| $Na_2S_2O_3$ | 1.0 | do | do | Do. |

*Nylon 6 yarn (spun from polymers of 6-aminocaproic acid).

In the manufacture of nylon 6 a fiber finish is applied to achieve surface lubricity, plasticizing action and static protection.

An any point where a yarn or fiber contacts another surface, such as draw-pins, guides or other fibers within the bundle, a lubricant maintains the fiber in useful form. In short, from the time fibers or filaments are formed until they are made into the final product, a finish is present to prevent damage to the fiber and to help perform the various steps in their processing.

When a finish containing between about 0.005% and 5%, and preferably not higher than about 2%, by weight percent on the polymer, of an anti-yellowing agent, such as sodium sulfite, sodium thiosulfate, the sodium bisulfite addition compounds of acetone or an appropriate aldehyde, is applied to nylon 6 yarn there is a significant reduction in yellowing. The preferred method for treating heat stabilized yarn is to add the reducing agent to the finish formulation.

The results of tests performed after incorporating sodium sulfite or sodium thiosulfate into the yarn finsh demonstrate a substantial improvement in the base color and yellowing characteristics of various heat stabilized nylon 6 samples, as set forth in Table II below. It is noted that in treating samples D and E in Table II, the color stabilizer, sodium thiosulfate, was applied as an over-finish, i.e., the application of a second finish.

during processing. One example of such a polymer is obtained by the condensation of hexamethylenediamine adipate, the resulting polymer being generally known as nylon 66.

By the process of the present invention the amount of color stabilizer to be used in a nylon yarn finish is not critical. Any amount of material in the finish consistent with emulsion stability and acceptable yarn performance in post extrusion operations, such as drawing, would be adequate. In practice, the concentration of additive to a finish would probably be less than 5% and preferably less than 1.5% by weight.

The preferred alkali salt additives are sodium sulfite, sodium thiosulfate and the sodium bisulfite addition compounds of acetone, methyl ethyl ketone, benzaldehyde, acetaldehyde and butyraldehyde. Exceptionally good overall results are obtained when the additive is sodium sulfite.

The preferred application of our process is the treatment of a nylon 6 yarn containing potassium iodide with a finish into which is incorporated a sodium sulfite additive for color stabilization, the concentration of the additive being between 5 and 0.1% preferably less than 1.5%.

While the present invention has been described in detail with respect to specific embodiments thereof, it is not intended that these embodiments circumscribe the invention except as it is limited by the claims.

We claim:

1. A solid aliphatic polyamide material having recurring carbonamide groups as integral parts of the main polymer chain containing an alkali metal iodide for heat stabilization which is resistant to yellowing, having in combination therewith an alkali salt reducing agent in the range of about 2% to about 20%, based on the weight of alkali metal iodide.

2. A polyamide article, said polyamide being aliphatic and having recurring carbonamide groups as integral parts of the main polymer chain, and containing an alkali metal iodide for heat stabilization which is resistant to yellowing, having in combination therewith an alkali salt reducing agent selected from the group consisting of sodium sulfite, sodium thiosulfate, and sodium borohydride and the sodium bisulfite addition compounds of acetone, methyl ethyl ketone, benzaldehyde, acetaldehyde and bu- TABLE II (H-15043 Revised)
[Yellowing characteristics of potassium iodide yarns [1]]

| Sample: | Nominal I-, p.p.m. | Percent KI [2] | Percent stabilizer plus type [2] | Concentration of stabilizer in finish,[3] percent | Stabilizer/KI | Yellowing [4] |
|---|---|---|---|---|---|---|
| A | 2,400 | .314 | None | ([5]) | | Marked. |
| B | 2,400 | .314 | .025% $Na_2SO_3$ | 0.5 | .080 | Very slight. |
| C | 2,400 | .314 | .050% $Na_2SO_3$ | 1.0 | .159 | Do. |
| D | 1,600 | .210 | None [6] | ([5]) | | Marked. |
| E | 1,600 | .210 | .020% $Na_2SO_3$ [6] | 1.0 | .095 | Slight. |
| H | 2,400 | .314 | None | ([5]) | | Moderate. |
| I | 1,800 | .236 | .005% $Na_2SO_3$ | 0.1 | .021 | Very slight. |
| K | 2,600 | .340 | .01% $Na_2SO_3$ | 0.2 | .029 | Do. |
| N | 1,800 | .210 | .05% $Na_2S_2O_3$ | 1.0 | .238 | None. |

[1] Nylon 6 yarn (spun from polymers of 6-aminocaproic acid).
[2] Weight percent on polymer.
[3] Finish was supplied to yarn to give 5% pick-up of finish, i.e. 5 grams of finish per 100 grams of yarn.
[4] One week exposure 16 inches from daylight fluorescent light subsequent to the application of a finish or over-finish.
[5] Control.
[6] Applied as over-finish (application of a second finish).

When the color stabilizer is added to a water insoluble polyamide it can be incorporated in the resinous base tyraldehyde added in the range of about 2% to about 20%, based on the weight of alkali metal iodide additive.

3. A polyamide article, said polyamide being aliphatic and having recurring carbonamide groups as an integral part of the main polymer chain containing an alkali metal iodide for heat stabilization, which is resistant to yellowing as a result of being contacted by a solution of an alkali salt reducing agent selected from the group consisting of sodium sulfite, sodium thiosulfate, and sodium borohydride and the sodium bisulfite addition compounds of acetone, methyl ethyl ketone, benzaldehyde, acetaldehyde and butyraldehyde added in the range of about 2% to about 20%, based on the weight of alkali metal iodide additive.

4. A polyamide article as described in claim 1 wherein the alkali salt reducing agent is selected from the group consisting of sodium sulfite, sodium thiosulfate, and sodium borohydride and the sodium bisulfite addition compounds of acetone, methyl ethyl ketone, benzaldehyde, acetaldehyde and butyraldehyde, and containing from 0.005 to about 5 percent by weight of alkali metal iodide, based on the weight of the polyamide.

5. A polyamide article as described in claim 4 wherein the alkali metal iodide is potassium iodide.

6. A polyamide article as described in claim 4 wherein the alkali salt reducing agent amounts to about 0.005 to 0.05 percent based on the weight of the polyamide.

References Cited

UNITED STATES PATENTS

| | | | |
|---|---|---|---|
| 2,960,486 | 11/1960 | Pye | 260—45.7 |
| 3,113,120 | 12/1963 | Papero, Jr., et al. | 260—45.7 |
| 3,274,150 | 9/1966 | Baevsky | 260—45.9 |
| 3,282,892 | 11/1966 | Griehl et al. | 260—45.75 |
| 3,318,827 | 5/1967 | Whittaker | 260—18 |
| 3,377,314 | 4/1968 | Anton | 260—45.75 |
| 3,384,615 | 5/1968 | Agouri et al. | 260—45.9 |
| 3,414,537 | 12/1968 | Dikotter et al. | 260—45.75 |
| 3,428,597 | 2/1969 | Dikotter et al. | 260—45.75 |
| 3,190,763 | 6/1965 | Schleede et al. | 106—186 |

HOSEA E. TAYLOR, Primary Examiner

R. A. WHITE, Assistant Examiner